United States Patent
Di Pace et al.

(10) Patent No.: US 9,707,818 B2
(45) Date of Patent: Jul. 18, 2017

(54) METHOD FOR OPERATING A MOTOR VEHICLE IN ORDER TO DETECT AN OVERLOAD ON A ROLL STABILIZER

(71) Applicant: Schaeffler Technologies AG & Co. KG, Herzogenaurach (DE)

(72) Inventors: Marco Di Pace, Herzogenaurach (DE); Martin Heckel, Nuremberg (DE); Christian Hackner, Hilpolstein (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 14/906,110

(22) PCT Filed: Jun. 18, 2014

(86) PCT No.: PCT/DE2014/200265
§ 371 (c)(1),
(2) Date: Jan. 19, 2016

(87) PCT Pub. No.: WO2015/007280
PCT Pub. Date: Jan. 22, 2015

(65) Prior Publication Data
US 2016/0159190 A1    Jun. 9, 2016

(30) Foreign Application Priority Data

Jul. 17, 2013 (DE) .......... 10 2013 011 898
Nov. 18, 2013 (DE) .......... 10 2013 223 424

(51) Int. Cl.
*G06F 7/00* (2006.01)
*B60G 17/015* (2006.01)
(Continued)

(52) U.S. Cl.
CPC ....... *B60G 17/0162* (2013.01); *B60G 17/016* (2013.01); *B60G 17/019* (2013.01);
(Continued)

(58) Field of Classification Search
USPC .......................................... 701/36; 280/5.509
See application file for complete search history.

(56) References Cited

U.S. PATENT DOCUMENTS

2003/0051554 A1* 3/2003 Stiller .................... B60G 11/27
73/760
2005/0179220 A1* 8/2005 Yasui ................. B60G 17/0162
280/5.506
(Continued)

FOREIGN PATENT DOCUMENTS

DE    102008024092    11/2009
DE    102009016165    10/2010
(Continued)

*Primary Examiner* — Thomas G Black
*Assistant Examiner* — Tyler Paige
(74) *Attorney, Agent, or Firm* — Volpe and Koenig, P.C.

(57) ABSTRACT

The invention relates to a method for operating a motor vehicle in order to detect an overload on a roll stabilizer which is supported so that it can rotate on a vehicle body and includes two stabilizer parts that can be rotated relative to each other by a torsional angle ($\Phi$) via a rotary drive arranged between these parts. In order to detect an impairment to the driving safety of the vehicle in a timely manner, a ratio of the torsional angle ($\Phi$) to a variable which is equivalent to an applied torque (M) of the rotary drive is ascertained, and an overload is determined if the ratio lies outside of a specified tolerance range.

10 Claims, 1 Drawing Sheet

(51) Int. Cl.
  *B60G 17/016* (2006.01)
  *B60G 17/019* (2006.01)
  *B60G 21/055* (2006.01)

(52) U.S. Cl.
  CPC .... *B60G 21/0555* (2013.01); *B60G 2202/135* (2013.01); *B60G 2202/413* (2013.01); *B60G 2202/42* (2013.01); *B60G 2400/51* (2013.01); *B60G 2400/60* (2013.01); *B60G 2400/98* (2013.01); *B60G 2600/08* (2013.01)

(56) References Cited

U.S. PATENT DOCUMENTS

| | | | | |
|---|---|---|---|---|
| 2005/0212224 | A1* | 9/2005 | Osterlanger | B60G 17/0162 280/5.511 |
| 2006/0138732 | A1* | 6/2006 | Buma | B60G 17/0162 280/5.5 |
| 2007/0150144 | A1* | 6/2007 | Yasui | B60G 17/0162 701/38 |
| 2007/0260373 | A1* | 11/2007 | Langer | G01M 17/007 701/31.4 |
| 2008/0111326 | A1* | 5/2008 | Taneda | B60G 17/0162 280/5.511 |
| 2009/0134595 | A1* | 5/2009 | Haller | B60G 17/0155 280/124.157 |
| 2009/0152824 | A1* | 6/2009 | Grieshaber | B60G 17/0162 280/5.509 |
| 2010/0019741 | A1* | 1/2010 | Ketteler | B60L 7/02 323/223 |
| 2010/0324780 | A1* | 12/2010 | Koumura | B60G 17/0165 701/38 |
| 2011/0209961 | A1* | 9/2011 | Yamamoto | F16D 1/101 192/3.28 |
| 2012/0029770 | A1* | 2/2012 | Hirao | B60G 17/08 701/38 |
| 2013/0270786 | A1 | 10/2013 | Mayer et al. | |
| 2014/0350818 | A1* | 11/2014 | Obermuller | B60T 8/172 701/74 |

FOREIGN PATENT DOCUMENTS

| | | | | |
|---|---|---|---|---|
| DE | 102011079842 | | 1/2013 | |
| WO | 2007054489 | | 5/2007 | |
| WO | WO 2007054489 A1 | * | 5/2007 | ......... B60G 17/0162 |
| WO | 2012041556 | | 4/2012 | |
| WO | WO 2012041556 A2 | * | 4/2012 | ......... B60G 21/0553 |

* cited by examiner

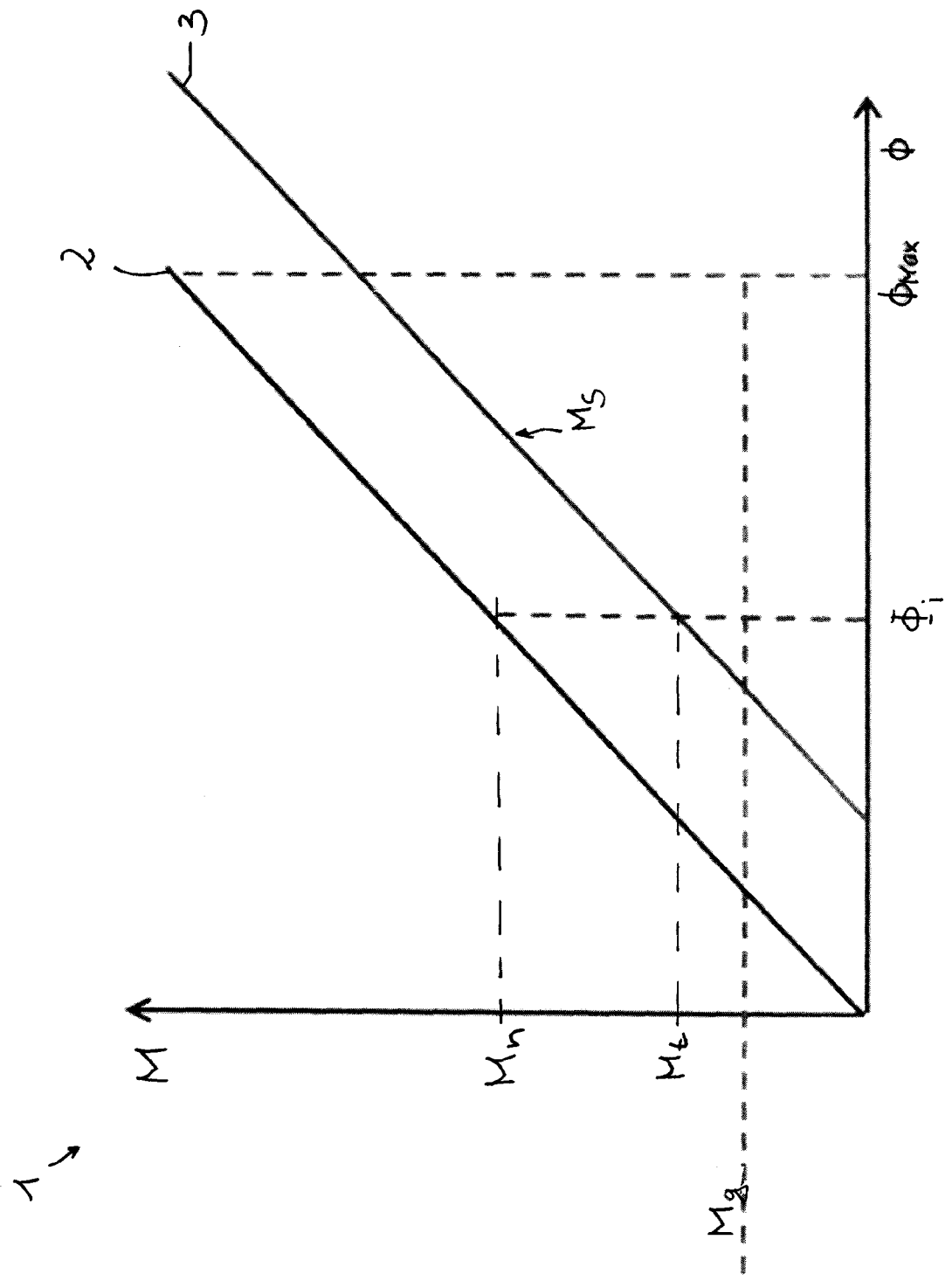

METHOD FOR OPERATING A MOTOR VEHICLE IN ORDER TO DETECT AN OVERLOAD ON A ROLL STABILIZER

FIELD OF THE INVENTION

The invention relates to a method for operating a motor vehicle for detecting an overload state of a roll stabilizer supported so that it can rotate on a vehicle body with two stabilizer parts that can rotate relative to each other by an angle of torsion via a rotary drive arranged between these parts.

BACKGROUND

Roll stabilizers, as they are known, for example, from publications WO 07/054 489 A1, WO 12/041 556 A2, and EP 2 543 528 A2, are used in motor vehicles for roll stabilization. Here, for example, stabilizer parts corresponding to a torsion spring are rotated relative to each other by an angle of torsion by a rotary drive, wherein the stabilizer parts are mounted so that they can rotate on the vehicle body. Through the rotation of the stabilizer parts relative to each other, an axle of the motor vehicle is stabilized in a desired plane, in that the stabilizer parts are rotated by the rotary drive and thus the wheels or the wheel carriers holding the wheels are lifted or lowered relative to each other.

In the event of an overload, for example, plastic deformation or a fracture of the parts of the roll stabilizer, for example, the rotary drive, the support, and/or the stabilizer parts, the supporting forces of the roll stabilizer and/or the support relative to the vehicle body can disappear abruptly, which can put the motor vehicle in an unsafe state, for example, in an oversteering state. Furthermore, control by the roll stabilizer during active roll stabilization can overcompensate for the disappearance of the supporting forces, for example, for a broken stabilizer part, so that the roll stabilizer can twist out of position quickly and uncontrollably. For example, in the case of a fracture of the mechanical connection of the roll stabilizer to the vehicle body, safety-critical faults could be produced, in that, for example, a wiring harness of the roll stabilizer or adjacent devices, for example, cables of wheel speed sensors, brake lines, and the like, could be cut or damaged.

SUMMARY

The object of the invention is therefore to provide a method for a motor vehicle for detecting an overload state of a roll stabilizer.

The object is achieved by one or more features of the invention. The Advantageous embodiments of the invention are described below and in the claims.

The present method is used to detect overload states of components of the roll stabilizer, as well as its mounting on the vehicle body and the wheel carriers. These overload states include, for example, plastic deformation and fractures of stabilizer parts, for example, in the form of torsion bar springs, the rotary drive, for example, its housing, mechanical connections or fixing devices of the roll stabilizer to vehicle parts, for example, the vehicle body, wheel carriers, stabilizer bar connecting links, stabilizer bearings, or the like.

In the present method, for detecting an overload state of a roll stabilizer that is supported so that it can rotate on a vehicle body and has two stabilizer parts that can be rotated relative to each other by an angle of torsion via a rotary drive arranged between these parts, a ratio of the angle of torsion to a parameter equivalent to an applied torque of the rotary drive is detected and an overload state is determined if the ratio is outside of a specified tolerance range.

According to advantageous embodiments, the equivalent parameters are all parameters from which the torque that is active between the stabilizer parts and is to be applied by the rotary drive for rotating the stabilizer parts by an angle of torsion necessary for the roll stabilization of the motor vehicle can be derived, estimated, or determined. For example, equivalent parameters can be detected by means of a torque sensor detecting the torque of the rotary drive. Such a torque sensor can be integrated into the rotary drive.

Advantageously, other components in the roll stabilizer can be eliminated if the torque is determined indirectly by derivation from already existing signals and parameters of already existing devices, for example, sensors. For example, the equivalent parameter for a hydraulic rotary drive that provides the torque by building up a pressure, such as an operating pressure, can be provided by evaluating the pressure for an angle of torsion set between the stabilizer parts. The pressure can here be detected by the signals of a pressure sensor integrated into a hydraulic circuit of the rotary drive.

For the use of an electromechanical rotary drive, the equivalent parameter for determining the torque can be formed by at least one electrical parameter of the rotary drive, for example, a current, such as an operating current, a voltage, a voltage drop, an electrical power, a pulse width of a pulse-width-controlled electric motor of the rotary drive, and/or a similar parameter for the set angle of torsion.

Furthermore, the equivalent parameter can be realized based on a relationship of the supporting forces of the roll stabilizer relative to the vehicle body. For this purpose, the equivalent parameter can be determined by a force sensor that is arranged on the supports of the roll stabilizer on the vehicle body and detects supporting forces of the roll stabilizer relative to the vehicle body.

Furthermore, a vehicle model can be formed in the motor vehicle with the roll stabilizer from comprehensive data from sensors and devices. For this purpose, control units in the motor vehicle for controlling individual units and devices, for example, for controlling the engine, transmission, suspension system, and the like, can communicate with each other via a network, such as a CAN bus, and can exchange, for example, data of operating states obtained by means of sensors and the like, so that a vehicle model can be simulated in a computing unit of one or more control units. Based on this data, the torque of the rotary drive can be simulated in the vehicle module for a specified angle of torsion and can be provided to the proposed method as equivalent parameters. Alternatively, with reference to the vehicle model, supporting forces of the roll stabilizer relative to the vehicle body can be determined from operating parameters and sensors of the vehicle model, wherein the determined supporting forces can form the equivalent parameters.

The method is preferably performed in a control unit for controlling the roll stabilizer or in a higher level controller, for example, in a suspension system controller. From the torque and the angle of torsion, preferably a torsion characteristic curve with a tolerance characteristic curve with reduced torques running in parallel to the torsion characteristic curve is formed. If the torque falls below the torque at these allocated angles of torsion, an overload state is detected. The tolerance characteristic curve is preferably formed as a straight line of the torque relative to the angle of torsion.

It has proven advantageous if the angle of torsion for detecting the overload state is determined by means of an external angle of torsion determined at the ends of the stabilizer parts minus an internal angle of torsion of the rotary drive. Alternatively or additionally with respect to a torque-dependent determination of the overload state, an exceeding of the angle of torsion can be realized by a maximum angle of torsion specified, for example, by an installation space situation of the roll stabilizer. An exceeding of the maximum angle of torsion is only possible if, for example, the housing of the rotary drive or at least one of the stabilizer parts, such as stabilizer arms, is plastically deformed or broken.

Furthermore, the type of overload state can be determined by the method in that, for a torque at a specified angle of torsion below a first threshold, a plastic deformation of at least one stabilizer part is determined. In this way, through the set angle of torsion, a reduced torque is necessary that still, however, applies a twisting of the stabilizer parts relative to each other. If the torque to be applied falls below a second threshold even more reduced relative to the first threshold, a fracture of at least one stabilizer part, both stabilizer parts, and/or the housing of the rotary drive is detected. In this way, the torques to be applied essentially correspond to friction forces of the roll stabilizer. A support of the angle of torsion between both wheel carries is no longer realized.

BRIEF DESCRIPTION OF THE DRAWING

The present method is explained in more detail with reference to the single FIGURE. This shows the torque to be applied for an angle of torsion set between two stabilizer parts, such as stabilizer arms.

DETAILED DESCRIPTION OF THE PREFERRED EMBODIMENT

The FIGURE shows the diagram 1 with the torque M to be applied by a rotary drive of a roll stabilizer for setting the angle of torsion $\Phi$ of stabilizer parts, such as torsion springs, stabilizer arms, and the like. The angle of torsion characteristic curve 2 shown as a straight line produces the relationship of the roll stabilizer operating without interference between torque M and angle of torsion $\Phi$. With increasing twisting of the stabilizer arms, the torque M to be applied by the rotary drive increases. The angle of torsion $\Phi$ is formed as an effective angle of torsion $\Phi$ from the difference $\Phi_{internal}$-$\Phi_{external}$ of the internal angle of torsion $\Phi_{internal}$ and the external angle of torsion $\Phi_{external}$. Here, the internal angle of torsion $\Phi_{internal}$ indicates the angle of twisting of the parts of the rotary drive and the external angle of torsion $\Phi_{external}$ indicates the twisting angle of the ends of the stabilizer arms. Due to aging, wear, and production variance, in addition to the angle of torsion characteristic curve 2, the torque M reduced for corresponding angles of torsion $\Phi$—here parallel tolerance characteristic curve 3 is also produced, which shows the still permissible behavior of the roll stabilizer. If the torque M to be applied by means of the set angle of torsion $\Phi_i$ up to the maximum angle of torsion $\Phi_{max}$ is between the regular moment $M_n$ and the tolerance moment $M_t$, an interference-free operation of the roll stabilizer is detected. Here, due to friction and the like, the basic moment $M_g$ is to be applied by the rotary drive. To prevent incorrect detections of an overload state of the roll stabilizer at small angles of torsion $\Phi$, the method for detecting an overload state is started only at angles of torsion $\Phi$, for example at angles of torsion $\Phi$ exceeding the angle of torsion $\Phi_i$, for which torques M to be applied that are significantly over the basic moment $M_g$ are required.

If the torques M to be applied up to the maximum angle of torsion $\Phi_{max}$ are below the tolerance characteristic curve 3 that is provided here as threshold $M_s$, an overload state of the roll stabilizer, for example, plastic deformation or fracture, is detected and, for example, the motor vehicle is stopped, a maximum vehicle speed is set (limp-home), or another measure is taken to protect the occupants from a dangerous situation by the motor vehicle.

Alternatively or additionally, an overload state can also be detected if an angle of torsion $\Phi$ can be set greater than the maximum angle of torsion $\Phi_{max}$, because such angles of torsion are outside of the roll stabilizer specifications and thus would lead to plastic deformation or a fracture of components of the roll stabilizer.

LIST OF REFERENCE NUMBERS

1 Diagram
2 Angle of torsion characteristic curve
3 Tolerance characteristic curve
M Torque
$M_g$ Basic moment
$M_n$ Regular moment
$M_s$ Threshold
$M_t$ Tolerance moment
$\Phi$ Angle of torsion
$\Phi_{external}$ External angle of torsion
$\Phi_{internal}$ Internal angle of torsion
$\Phi_{max}$ Maximum angle of torsion
$\Phi_i$ Angle of torsion

The invention claimed is:

1. A method for operating a motor vehicle including a roll stabilizer supported for rotation on a vehicle body with two stabilizer parts that are rotatable relative to each other by an angle of torsion via a rotary drive arranged between said two stabilizer parts, the method comprising:
   collecting data by at least one sensor;
   receiving, by a control unit, a parameter equivalent to an applied torque (M) of the rotary drive, wherein the parameter equivalent to an applied torque (M) is determined based on the data;
   determining, by the control unit, a ratio of the angle of torsion ($\Phi$) to the parameter equivalent to an applied torque (M) of the rotary drive;
   comparing, by the control unit, the ratio to a specified tolerance range; and
   detecting, by the control unit, an overload state if the ratio is outside of the specified tolerance range.

2. The method according to claim 1, wherein the equivalent parameter is determined by a torque sensor detecting the torque of the rotary drive.

3. The method according to claim 1, wherein the equivalent parameter is determined by a pressure sensor detecting a pressure for providing the torque of the rotary drive which is a hydraulic rotary drive.

4. The method according to claim 1, further comprising carrying out the determining of the equivalent parameter by a force sensor arranged on a support of the roll stabilizer on the vehicle body and detecting supporting forces of the roll stabilizer relative to the vehicle body.

5. The method according to claim 4, further comprising with reference to a vehicle model of a motor vehicle formed from operating parameters and sensors, determining the supporting forces of the roll stabilizer relative to the vehicle body and the determined supporting forces form the equivalent parameters.

6. The method according to claim 1, further comprising forming an angle of torsion characteristic curve with a tolerance characteristic curve set apart from the angle of torsion characteristic curve with reduced torques (M) from the torque (M) and the angle of torsion ($\Phi$) and determining the overload state if the torque (M) of the tolerance characteristic curve falls below the angles of torsion ($\Phi$) allocated to said characteristic curves.

7. The method according to claim 1, wherein the angle of torsion ($\Phi$) is determined by an internal angle of torsion ($\Phi_{internal}$) of the rotary drive minus an external angle of torsion ($\Phi_{external}$) determined at ends of the stabilizer parts.

8. The method according to claim 1, wherein the overload state is determined if the angle of torsion ($\Phi$) exceeds a maximum specified angle of torsion ($\Phi_{max}$).

9. The method according to claim 1, wherein the overload state is started at angles of torsion ($\Phi$) greater than a specified angle of torsion ($\Phi_i$) for the torque (M) exceeding a friction-dependent basic moment ($M_g$).

10. The method of claim 1, wherein the equivalent parameter is determined by an electrical parameter of the rotary drive which is an electromechanical rotary drive.

* * * * *